(12) United States Patent　　(10) Patent No.:　　US 7,513,130 B2
Bisazza et al.　　　　　　　　　(45) Date of Patent:　　Apr. 7, 2009

(54) APPARATUS FOR PRODUCING TESSERAE OF GLASS MOSAIC CONTAINING A METAL FOIL

(75) Inventors: Giancarlo Bisazza, Vicenza (IT); Aldo Besoli, Montecchio Maggiore (IT)

(73) Assignee: Bisazza SpA, Spilimbergo (PN) (IT)

( * ) Notice: Subject to any disclaimer, the term of this patent is extended or adjusted under 35 U.S.C. 154(b) by 651 days.

(21) Appl. No.: 10/963,377

(22) Filed: Oct. 12, 2004

(65) Prior Publication Data

US 2005/0118432 A1　Jun. 2, 2005

Related U.S. Application Data

(63) Continuation of application No. PCT/IB03/01340, filed on Apr. 11, 2003.

(30) Foreign Application Priority Data

Apr. 12, 2002　(IT) ................................ 2002A0083

(51) Int. Cl.
　　　*C03B 27/02*　　(2006.01)
(52) U.S. Cl. ..................... 65/59.3; 65/DIG. 5
(58) Field of Classification Search ............... 65/59.3, 65/90, 92–94, 97, 106–107, 244–245, 258–259, 65/268–289, 270–275, 305–306, 311–316, 65/361

See application file for complete search history.

(56) References Cited

U.S. PATENT DOCUMENTS

| 370,176 | A | * | 9/1887 | Brogan et al. ................... 65/93 |
| 3,589,882 | A | * | 6/1971 | Carstensen et al. ............. 65/70 |
| 3,692,508 | A | * | 9/1972 | Prislan ........................... 65/91 |
| 5,421,849 | A | * | 6/1995 | Hirota ........................... 65/237 |
| 7,240,519 | B2 | * | 7/2007 | Schwartz et al. ............. 65/104 |

FOREIGN PATENT DOCUMENTS

| DE | 1 085 304 | 7/1960 |
| DE | 197 29 772 A1 | 1/1999 |
| EP | 0 844 218 A1 | 5/1998 |
| GB | 392121 | 5/1933 |
| JP | 55158137 | 12/1982 |

* cited by examiner

*Primary Examiner*—Steven P Griffin
*Assistant Examiner*—Queenie Dehghan
(74) *Attorney, Agent, or Firm*—Panitch Schwarze Belisario & Nadel LLP

(57) ABSTRACT

Method and plant to make tesserae (11) for glass mosaic, containing ornamental metal foil (14) inside. The method comprises the steps of positioning a first glass strip (30), with a metal foil (14) associated above, on a work plane (20) including first molding means (22), localized heating of the work plane (20) to obtain a softening of the first glass strip (30), casting a quantity of glass onto the metal foil (14), pressing the semi-worked product (29) in its plastic state, and molding the semi-worked product (29) to define the contours of the tesserae (11), by means of cooperation between second molding means (19) and the first molding means (22). One or more of the steps are performed sequentially in at least one work station (40-49).

13 Claims, 3 Drawing Sheets

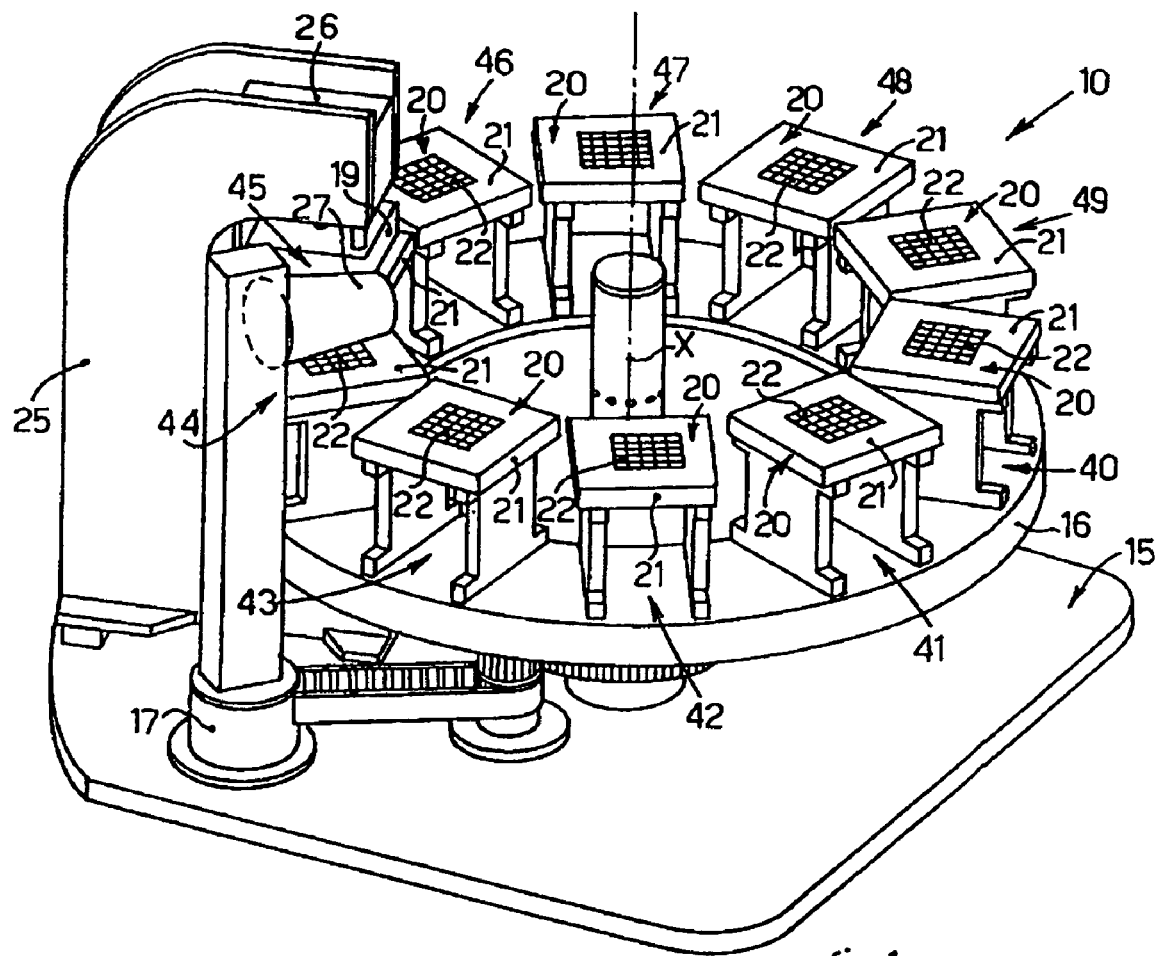
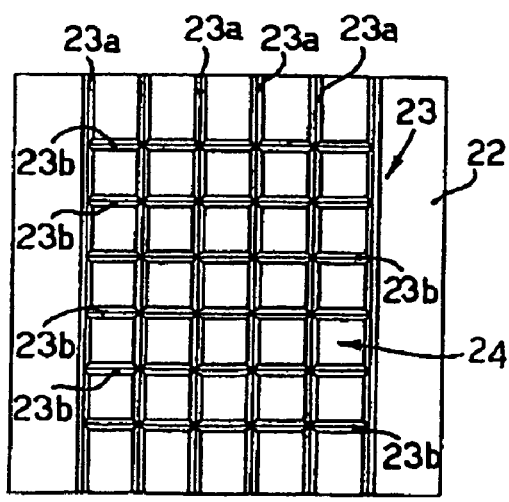
fig.2
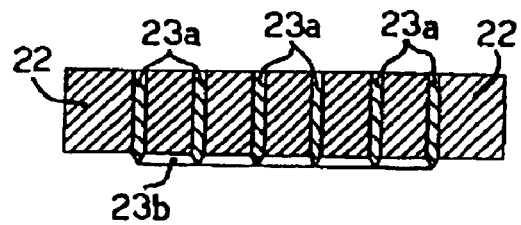
fig.3
fig.1

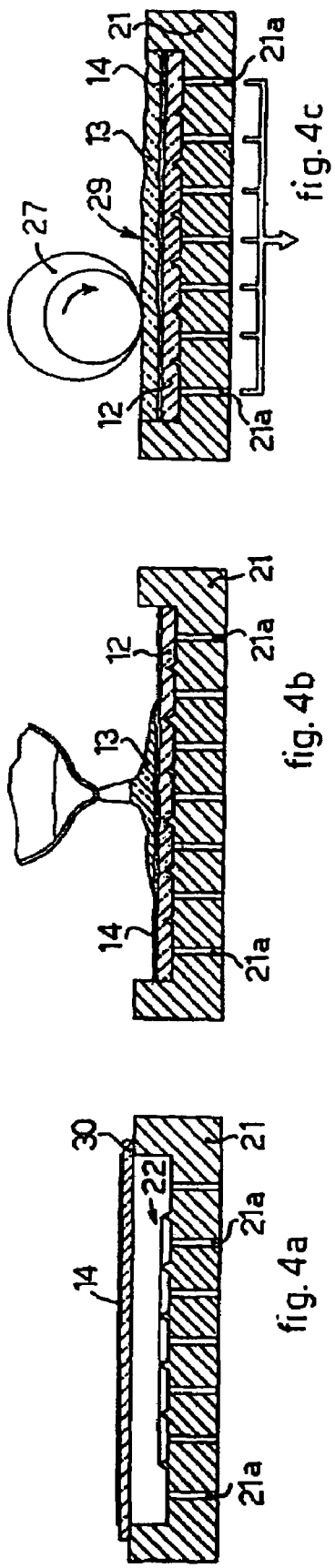

APPARATUS FOR PRODUCING TESSERAE OF GLASS MOSAIC CONTAINING A METAL FOIL

CROSS-REFERENCE TO RELATED APPLICATIONS

This application is a continuation of International Application No. PCT/IB03/01340, filed Apr. 11, 2003, which was published in the English language on Oct. 23, 2003, under International Publication No. WO 03/086780 A1 and the disclosure of which is incorporated herein by reference.

BACKGROUND OF THE INVENTION

The present invention concerns a method to produce tesserae or slabs of glass mosaic, of the type containing an ornamental metal foil, for example gold, called golden mosaic. In the following description we shall talk essentially about gold foil or leaf, but it should be understood that the foils can be of silver, gold or silver alloys or other enhancing materials of a more or less precious nature.

The method according to the invention is concerned particularly with a process to make tesserae or slabs containing gold foil, wherein the processing steps are performed in sequence, substantially automatically and without the need for subsequent trimming or other manual interventions on the product.

The invention also concerns the plant for the automatic production of the tesserae of mosaic with gold leaf, and also the tesserae or slabs thus obtained.

One of the techniques used to make glass tesserae for mosaics aesthetically particular and valuable is to insert at least a layer of metal material, with thicknesses which can reach about 10÷30 µm, between two or more layers of transparent glass. This technique, which has very ancient roots, has evolved in the history of art, without substantially changing its method of production. In fact, in our own day, such types of tesserae continue to be mainly produced manually.

Metal foil, or the so-called gold leaf, is made to adhere to a previously cast glass plate resting on a metal plane suitably heated until it softens the glass; attention must be paid, however, that the melting point of the metal is not reached, which in the case of gold is around about 1050÷1080° C. In this step molten glass is also poured above the metal leaf so as to form a single three layer element: glass-metal-glass. Instead of casting molten glass, glass powder is added which, when it melts, forms a protective layer on the metal foil. The three-layer element is carefully pressed to ensure that the layers adhere properly.

Subsequently, the semi-worked product thus obtained is inserted into an annealing furnace to eliminate the surface tensions and then it is squared and cut manually by means of diamond tools.

This method is totally manual, which entails very long times and high production costs. Moreover, since this technique is difficult to do, satisfactory results are not always achieved even when glass-workers of considerable experience are supervising.

Another disadvantage is that, since they are made manually one by one, the tesserae often have an irregular shape, particularly along the edges, a different thickness and a shape not coherent with the geometrical shapes, such as the double-opposed inclined plane shape, of the non-enhanced tesserae produced with automated systems, with which they are laid on the walls or floors. This entails considerable problems during the forming step of sheets of mosaics which comprise some golden tesserae inserted into mosaics with non-enhanced tesserae, and entails the need for particular attention during laying.

EP 844.218 A, as an example of prior art, discloses a method for manufacturing gold slabs for mosaic comprising a step of applying a fluid suspension containing gold to a glass sheet of a first greater thickness, a step of heating the glass sheet and the suspension so as to obtain a film-like coating of the sheet, a step of protecting film-like coating with a layer of molten glass of a second lesser thickness, and a step of heating the layers so as to obtain a single sheet composed of the two layers of glass and the gold coating. This document, however, does not solve the shortcomings related to the edge shape of the mosaic gold slabs thus obtained. Moreover, the method is slow and requires a preparatory step to prepare the suspension containing gold and requires much skill and experience to obtain the desired thickness of the gold leaf from a dust suspension.

Furthermore, this document does not disclose how can be designed an apparatus for performing the method and directed to a mass, automatic and standard production of the gold slabs.

DE 10 85 304 B discloses a method for producing glass mosaic slabs containing inside a metallic layer, in which the inner metallic layer is covered by glass dust before the sandwich is placed in a furnace for the fusion. This document refers to a known technique in the art of the mosaic and entails all the shortcomings listed above.

The present Applicant has devised and embodied this invention to overcome the shortcomings of the state of the art and to obtain further advantages.

BRIEF SUMMARY OF THE INVENTION

The present invention is set forth and characterized essentially in the main claims, while the dependent claims describe other innovative characteristics of the invention.

One purpose of the invention is to perfect a method which will allow to make glass tesserae or slabs for mosaics, of the type containing at least an ornamental metal foil, for example gold, in a completely automatic fashion, in order to considerably reduce the times and costs of production and, at the same time, to ensure a satisfactory quality and repeatable process.

Another purpose of the invention is to achieve a plant which will allow to automatically produce glass tesserae or slabs for mosaics, of the type containing an ornamental metal foil.

A further purpose is to obtain tesserae of gold mosaic with a shape which can be selectively chosen from at least two shapes, simply by means of replacing the counter-mold used in the pressing step; a first shape similar to the present shape, substantially square, but without the relative problems of irregular size, poor resistance and poor adhesion of the gold foil which affect current tesserae of gold mosaic as produced manually; and a second shape similar to the shape of standard mosaic tesserae, of the diamond type, i.e. with double-opposed inclined planes, which apart from solving the problems set out above, allows to use said gold mosaic tesserae together with non-enhanced mosaic tesserae, having a similar diamond shape, in automatic gluing lines.

In accordance with these purposes the method according to the invention comprises the following steps:

positioning a first glass strip, with which the enhancing metal foil is associated above, on a work plane able to move sequentially between a plurality of work stations;

localized heating of the work plane to obtain a softening of the first glass strip, and casting a defined quantity of glass in its molten state onto the metal foil, so as to form a second glass strip above the metal foil, in order to define a semi-worked product with three layers: glass-foil-glass;

pressing and, optionally, simultaneous suction of the semi-worked product, to facilitate adhesion between its three layers and adherence with the work plane;

molding the semi-worked product to define the edges and the shape of the mosaic tesserae, and, optionally, blowing the mosaic tesserae to facilitate cooling and detachment from the work plane; and possible annealing of the mosaic tesserae in order to eliminate the surface tensions which form after cooling.

In a preferential embodiment, each of the steps indicated above is performed in a relative work station reached sequentially by the work plane. According to a variant, the same work station can provide to execute two or more of said steps. According to a further variant, the movement of the work station is unidirectional, for example along a circle or a loop.

According to a further variant, the invention provides that the steps of loading, casting the glass and discharge of the tesserae are also automated.

To achieve the method described above, the invention comprises a plant for the automatic production of glass mosaic tesserae or slabs with an enhancing ornamental metal foil inserted inside them.

The plant comprises a plurality of work planes, advantageously each of limited size and able to be moved in sequence, for example like a carousel, or linearly along a conveyor belt, or in any other way, through a mating plurality of work stations.

Each work plane comprises first molding means, for example a grid to form a first face of the mosaic tesserae, while at least one work station comprises mating second molding means, for example a shaped plate, able to define, in cooperation with the first molding means, the second face of the mosaic tesserae as well.

The tesserae thus formed are already finished on the edges according to a regular and perfectly repeatable geometry and shape, and therefore are ready to be applied on the wall or floor; in the event that the tesserae are produced with a beveled shape on the sides, for example having a double-opposed inclined plane shape, they can be inserted into panels or sheets comprising a plurality of non-enhanced mosaic tesserae of a standard shape, between which some enhanced tesserae obtained with the method according to the invention are inserted.

To this purpose, simply by means of replacing the counter-mold of the second molding means, the invention allows to achieve tesserae having either a squared shape substantially like a parallelepiped, or a shape with a double inclined plane coherent with that of standard non-enhanced mosaic tesserae produced automatically, so as to facilitate possible automated gluing operations and to simplify laying.

The double-opposed inclined planes may have a different thickness in order to position the metal foil closer or farther from the outer side of the tessera or slab when it is in use. One or the other of the two possible ways to position the tessera, with the metal foil closer or farther form the outside, would be preferably chosen according if the tessera is to be applied for a covering or for a floor.

The sloping angle of the inclined planes may preferably vary from 2 to 60 degrees; the sloping angles in the same tessera may be different for the two inclined planes or the angles may be equal each other.

With the method and plant to make glass mosaic tesserae according to the present invention it is possible to totally eliminate the manual steps of diamond cutting and squaring off the tesserae, since this operation is performed automatically in a relative molding station. The elimination of these steps allows to make tesserae of more regular size and to reduce waste material.

Moreover, all the processing steps are accelerated and rationalized.

The preferred limited size of each of the work planes allows to increase the possibility to control the parameters of the temperatures used to heat the glass, since these limited sizes allow to use separate and localized burners, and thus considerably reduce the heat dispersions produced, thereby leading to a reduced energy consumption.

Moreover, with this method we improve the adhesion of the two layers of glass and the metal foil, thus leading to an increase in the resistance, both physical and chemical, of the glass mosaic tesserae.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 1 is a diagram of a plant to make mosaic tesserae according to the invention;

FIG. 2 shows a detail of first molding means of the plant in FIG. 1;

FIG. 3 shows a lateral sectioned view of FIG. 2;

FIGS. 4a-4e show some steps in the production of the mosaic tesserae according to the invention;

DETAILED DESCRIPTION OF THE INVENTION

Figure 5A:
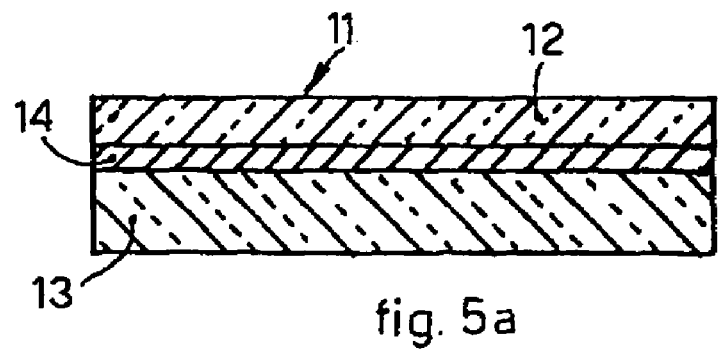
FIGS. 5a-5b-5c show three transverse sections of respective mosaic tesserae made with the plant in FIG. 1.

FIG. 1 shows a plant 10 for the production of mosaic tesserae 11 (FIG. 5a, 5b, 5c), consisting of two layers of glass, respectively a first layer 12 and a second layer 13, preferably of a greater thickness than the first layer 12, between which there is an ornamental metal foil 14, for example gold, silver or alloys thereof.

In the case of tesserae 11 of a squared shape as shown in FIG. 5a, the first layer 12, of lesser thickness, constitutes the visible layer in the case of an application for coverings, whereas it constitutes the invisible layer in the case of an application for floors.

The plant 10 (FIG. 1) comprises a supporting platform 15 on which is mounted, rotatable substantially continuously, a central table 16 substantially circular in shape and able to rotate around a vertical axis X. Above the table 16 a plurality of work planes 20 are associated, in this case ten, each of which comprises at least a base 21 on which first molding means 22 are provided.

The work planes 20, in association with the table 16, form a carousel which takes the work planes 20 in sequence through a mating plurality of work stations 40-49.

According to a variant not shown here, the work planes 20 can be positioned along a straight or slightly curved line and be subjected to an alternate movement through the work stations.

The work stations comprise at least: a loading station 40, 41 to load the glass strip 13 with the metal foil 14 above, a heating station 42, a casting station 43 to form a second glass strip 12, a surface levelling and smoothing station 44 to make the surface uniform, a molding station 45, 46, a cooling and detachment station 47, and a discharge and unloading station 48, 49 to discharge the finished tesserae 11.

The tesserae 11 can then be sent to an annealing station, not shown here.

In correspondence with the levelling and smoothing station 44 there are pressing means 18 consisting of a roller 27 shaped like a truncated cone, positioned so that its circular surface has at least a longitudinal segment substantially parallel to and facing the corresponding base 21.

The movement of the truncated cone roller 27 is achieved, in a preferential embodiment, by the same drive element 17 which takes the table 16 into rotation with respect to the platform 15.

The molding station 45 includes second molding means 19, suitable to cooperate with the first molding means 22 provided in each of the bases 21. The second molding means 19 comprise a pillar 25 on which a counter-mold 28 is mounted, associated with a linear actuator 26.

Figure 5B:
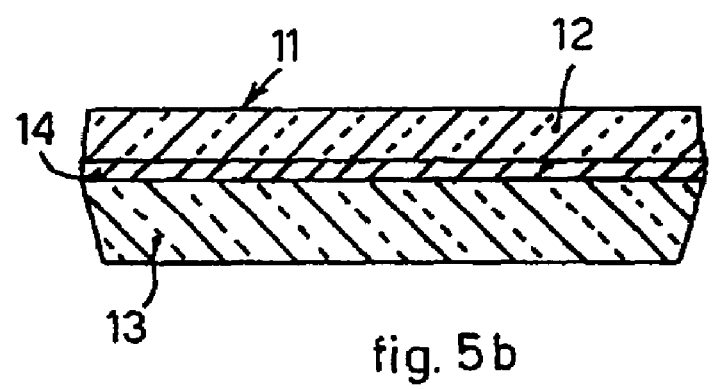
Figure 5C:
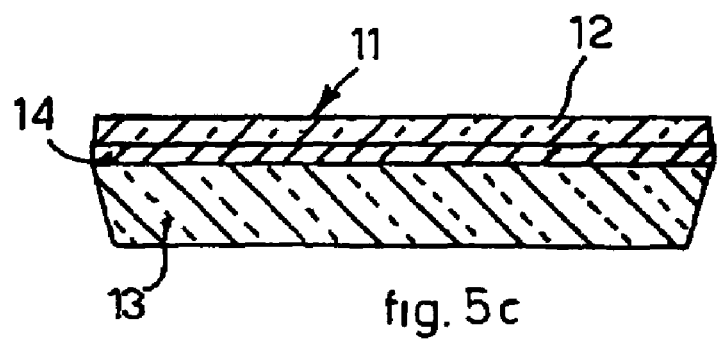

The counter-mold 28 is of the replaceable type according to the shape the tesserae 11 have to be, either squared as in FIG. 5a or with beveled sides as in FIGS. 5b and 5c. The shape shown in FIG. 5c is similar to that of FIG. 5b but has the first layer 12 thinner than the second layer 13. This shape allows to position the metal foil 14 very close to the outer face of the tessera and this is particularly useful when the tesserae are used for covering. The sloping angles of the beveled sides may vary in a very broad range, from a minimum value very low, for example 2 or 3 degrees, particularly for the first thinner layer 12, to a maximum value around 60 degrees.

This operation to replace the counter-mold 28 makes it extremely easy and rapid to reconfigure the plant to produce tesserae 11 of one type or the other, or with different sizes, different sloping angles or different proportions of the thickness of the two glass layers 12 and 13, according to production requirements.

The linear actuator 26 is able to selectively drive the counter-mold 28, to take it to press against the stratiform glass article, so as to form the tesserae 11, in cooperation with the first molding means 22.

To guarantee enough time for molding, the pillar 25 is mounted on the platform 15 and can slide with respect to the latter in order to follow at least one segment of the rotation of the table 16.

The first molding means 22, shown in detail in FIGS. 2 and 3, comprise a grid 23 formed by a plurality of vertical cutters 23a, which intersect orthogonally with a plurality of horizontal cutters 23b, so as to define substantially square areas 24.

Also the first molding means 22 are advantageously of the replaceable-type to allow to change the size and the shape of the tesserae according to the requirements.

The counter-mold 28 has a conformation mating with that of the first molding means 22, and comprises vertical and horizontal cutters, not shown in detail in the drawings, which, in cooperation with the cutters of the first molding means 22, define the size of the tesserae 11 and the perimeter shaping thereof.

The vertical cutters 23a, the horizontal cutters 23b and the cutters of the counter-mold 28 define the standardized and repeatable contour of the tesserae 11, which can be substantially squared in shape like a parallelepiped (FIG. 5a), or assume an aesthetic conformation with a double inclined plane (FIG. 5b; FIG. 5c) coherent with the shape of standard non-enhanced mosaic tesserae obtained with conventional-type methods.

In both cases, we obtain a greater regularity in the size of the tesserae 11 produced, a greater resistance and a greater adhesion of the gold foil to the layers above and below, compared with manually produced gold mosaic tesserae.

In the case of tesserae of the type shown in FIG. 5b and FIG. 5c, they can be inserted into automatic gluing lines which achieve sheets comprising both enhanced and non-enhanced tesserae.

The plant 10 to produce tesserae 11 according to the invention functions as follows.

Driving the drive element 17 activates both the rotation of the truncated cone roller 27 and also the table 16, thus causing the work planes 20 to be moved sequentially through the work stations 40-49.

Since all the rotating parts are driven by a single drive means 17, a perfect synchronism is guaranteed of all the components of the plant and thus mistakes and inaccuracies in positioning are avoided.

In the first station, or loading station 40, of the plant 10, a first glass strip 30 is loaded onto one of the bases 21.

In a first embodiment, the gold foil 14 is already laid on the first glass strip 30.

According to a variant, the gold foil 14, which can vary in thickness between about 10 and about 20 μm (FIG. 4a), is arranged above the glass strip 30 in a subsequent station, denoted by the reference number 41.

As it rotates, the table 16 takes the base 21 into correspondence with the third heating station 42, where the base 21 is heated until the glass strip 30 reaches a state of substantial softening, so that the glass can be arranged inside the areas 24 of the first molding means 22 made on the base 21, so as to form a first layer 12 of the tesserae 11.

In the following station 43, a quantity of molten glass (FIG. 4b) is cast above the foil 14, so as to form the second layer 13. This operation forms a semi-worked piece 29 with three alternate layers: glass-gold-glass.

Subsequently, the work plane 20 reaches the levelling and smoothing station 44 where there is the truncated cone roller 27, cooled inside. In this step (FIG. 4c), the surface of the semi-worked product 29 is made uniform and at the same time suction is performed thereon, through holes 21a in the base 21, so that the layer 12 adheres perfectly to the surface of the grid 23, and the three layers 12, 13 and 14 are perfectly adherent to each other.

Then, the semi-worked product 29 is sent to the molding station 45, 46 for the tesserae 11 (FIG. 4d). The actuator 26 drives the counter-mold 28, so as to take it to act on the semi-worked product 29 which is resting on the grid 23 of the first molding means 22, so that the respective cutters define the contours, size and faces of the tesserae 11.

To obtain a satisfactory molding result, the cooperation between the first and second molding means is maintained for some seconds; to obtain this, the pillar 25, with which the counter-mold 28 is associated, follows the rotation of the table 16 for a certain segment, as far as in correspondence with the station 46. Once the molding operation is concluded, the counter-mold 28 is returned by the actuator 26 to the initial raised position, and the pillar 25 is also returned, for example by means of another linear actuator not shown in the drawings, to its initial position, to prepare to receive the subsequent work plane 20.

In the subsequent cooling station 47, the tesserae 11 formed are cooled and detached from the base 21, in this case by means of a puff of air from the holes 21a (FIG. 4e).

After this cooling, the tesserae 11 arrive at a discharge and unloading station 48, 49 where they are detached from the supporting base 21.

The tesserae 11 can then be sent to an annealing station, where they are heated and then left to cool, so as to eliminate the surface tensions of the glass which are formed during the previous processing steps.

Subsequently, the tesserae 11 are sent for possible packing and storage.

It is clear, however, that modifications and/or additions of parts can be made to the plant 10 as described heretofore, without departing from the field and scope of the present invention.

For example, the rotation of the table 16 can occur stepwise, as well as continuously as shown here. One or more of the working steps described above can be performed in the same work station, or one or more of the work stations described here can be absent.

Moreover, it is also possible to automate the steps of loading the glass strip with the gold foil, casting the glass and discharging the tesserae, in a manner coordinated with the functioning of the plant 10.

It is also clear that, although the present invention has been described with reference to specific examples, a person of skill in the field shall certainly be able to achieve many other equivalent forms of method and plant 10 for making mosaic tesserae containing a thin metal foil, all of which shall come within the field and scope of the present invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A plant for making glass tesserae used in creating mosaics, the tesserae having an ornamental metal foil disposed between an upper glass layer and a lower glass layer that are fused together, the plant comprising:
    a plurality of work planes each including a first mold, the first mold having an upwardly protruding grid that includes a plurality of vertical cutters which intersect in a substantially orthogonal fashion with a plurality of horizontal cutters; and
    a plurality of work stations for forming the tesserae, the plurality of work stations including at least a loading station for loading the lower glass layer in a substantially solid state onto the first mold, a subsequent heating station for softening the lower glass layer into general conformity with a shape of the first mold and a subsequent molding station that includes a second mold to be selectively activated and in cooperation with each of the first molds to mold the upper glass layer and position the tesserae between the first and second molds, the second mold having a downwardly protruding grid that includes a plurality of vertical cutters which intersect in a substantially orthogonal fashion with a plurality of horizontal cutters, the vertical and horizontal cutters of the first and second molds defining the size and shape of each of the tesserae,
    wherein the plurality of work planes are moved sequentially through the plurality of work stations.

2. The plant of claim 1, wherein the plurality of work stations further includes a second loading station for loading the metal foil on to an upper surface of the lower glass layer prior to entering the heating station.

3. The plant of claim 1, wherein the plurality of work stations further includes a casting station after the heating station to cast the upper glass layer onto the metal foil.

4. The plant of claim 3, wherein the plurality of work stations further includes a leveling and smoothing station after the casting station to make an upper surface of the upper glass layer generally uniform.

5. The plant of claim 4, wherein the leveling and smoothing station includes a pressure element formed by a frusto-conically shaped roller.

6. The plant of claim 5, wherein the pressure element is cooled internally.

7. The plant of claim 1, wherein the second mold is replaceable.

8. The plant of claim 1, wherein the plurality of work stations further includes a cooling station after the molding station to cool and remove the tesserae.

9. The plant of claim 1, wherein the first molds are replaceable.

10. The plant of claim 1, wherein the work planes are mounted on a rotatable table.

11. The plant of claim 1, wherein each work plane include a plurality of holes extending below the first mold.

12. The plant of claim 1, wherein the plurality of work stations and the movement of the work panes are driven by a single driver.

13. The plant of claim 1, wherein the vertical and horizontal cutters of the first and second molds are tapered to form tesserae having a double inclined plane outer peripheral edge.

* * * * *